United States Patent [19]

Mayer

[11] Patent Number: 4,603,555
[45] Date of Patent: Aug. 5, 1986

[54] APPARATUS FOR CONTAINING AN ENERGY STORAGE FLYWHEEL

[75] Inventor: Rayner M. Mayer, Yateley, England

[73] Assignee: The British Petroleum Company p.l.c., London, England

[21] Appl. No.: 607,630

[22] Filed: May 7, 1984

[30] Foreign Application Priority Data

May 21, 1983 [GB] United Kingdom ............... 8314142

[51] Int. Cl.$^4$ .............................................. F15B 7/10
[52] U.S. Cl. ....................................... 60/721; 74/609; 192/112
[58] Field of Search .......................... 74/572, 606, 609; 192/112; 123/198 D, 198 E, 195 C; 415/9; 416/247; 60/909, 327, 721

[56] References Cited

U.S. PATENT DOCUMENTS

| | | | |
|---|---|---|---|
| 1,742,643 | 1/1930 | Boehm | 74/609 X |
| 2,290,588 | 7/1942 | Grondahl | 74/572 |
| 2,995,011 | 8/1961 | Kimmel | 60/909 X |
| 3,074,585 | 1/1963 | Koontz | 60/909 X |
| 3,241,813 | 3/1966 | Von Flue et al. | 415/9 |
| 4,208,921 | 6/1980 | Keyes | 74/572 |

Primary Examiner—Edward K. Look
Attorney, Agent, or Firm—Morgan, Finnegan, Pine, Foley & Lee

[57] ABSTRACT

Apparatus suitable for containing a rotatable body such as a flywheel comprising at least two parts which together define a housing within which the rotatable body can be rotated. The parts of the housing are not rigidly fixed together but instead they are secured together by a length of high tensile strength tape which is wrapped around the parts to provide at least one layer of tape, overlapping at its edges which envelopes and is in contact with at least 50%, and preferably at least 70%, of the surface area of the housing. An impact of the rotatable body, or a part thereof, with the inner surface of the housing causes movement and/or deformation of at least one of the parts of the housing. This movement and/or deformation is resisted by the tape and the point loading resulting from the impact is thereby transformed into a loading over the surface of the parts wrapped with tape.

19 Claims, 5 Drawing Figures

APPARATUS FOR CONTAINING AN ENERGY STORAGE FLYWHEEL

The present invention relates to apparatus suitable for containing a rotatable body such as an energy storage flywheel.

The ability of flywheels to accept and discharge energy over relatively short periods of time has been known for many years and energy storage flywheels have been used, or proposed for use, in a variety of applications. One application which has received increasing attention in recent years is the use of a flywheel as a means of storing kinetic energy in motor vehicles in order to improve fuel economy.

In the event of a failure of a flywheel, the stored energy must be safely dissipated or absorbed. Thus, the flywheel should be contained in a housing which is capable of preventing the penetration of the flywheel or fragments thereof under all conditions. This is particularly important if the flywheel is used on a motor vehicle in which case the housing should be able to contain the flywheel or fragments thereof during a possible collision and should also be able to withstand impacts from stones and road debris. The housing should also be able to contain the flywheel or dissipate its stored energy in the event of fire.

Conventionally, the flywheel housing has been made of a sufficient quantity of a strong material, usually metal, regardless of the weight. However, in the case of flywheels used in motor vehicles the flywheel housing should be as light as possible, otherwise the excess weight could negate any fuel saving resulting from the use of the flywheel.

The applicants have invented a flywheel housing which is relatively light but which is capable of safely containing a flywheel or fragments thereof in the event of failure of the flywheel.

According to the present invention apparatus suitable for containing a rotatable body such as a flywheel which apparatus comprises at least two parts which together define a housing within which the rotatable body can be rotated, is characterised in that the parts are secured together by a length of a high tensile strength tape which is wrapped around the parts to provide at least one layer of tape, overlapping at its edges, which envelopes and is in contact with at least 50% of the surface area of the housing such that a point loading caused by the impact of the rotatable body or of a part thereof with the inner surface of the housing is transformed into a loading over the surface of the parts wrapped with tape.

Although the apparatus according to the present invention is particularly suitable for containing energy storage flywheels it is also suitable for containing other moving parts, particularly rotating parts. The invention will be described in this specification with reference to its use as a container for an energy storage flywheel. However, this should not be taken as limiting the invention to use with flywheels.

Conventional flywheel housings are relatively massive and rigid. Preferably, however, the parts of the apparatus according to the present invention which define the housing are relatively light and are preferably deformable under load, at least over those areas which are most likely to be subjected to impact. Deformation of the part will absorb energy and transfer energy to the tape but the maximum permissable amount of deformation will be determined by such factors as the materials of construction and the space within which the housing is to be used. The shape and dimensions of the parts of the housing will be selected to provide for deformation under load, taking into consideration the maximum impact load to which the parts are expected to be subjected and the materials of construction.

The housing comprises at least two parts which are not rigidly connected but are secured together by a length of a high tensile strength tape. If the flywheel fails the flywheel or a fragment of the flywheel striking part of the housing will cause the part to deform and/or move relative to the other parts. This deformation or movement absorbs energy but is resisted by the tape which overwraps and is in contact with the parts. Thus a point loading is transferred to a loading over the surface of the parts which are wrapped with the tape.

The internal dimensions of the housing are slightly larger than the expected maximum dimensions of the flywheel. When a flywheel is rotated at increasing speed, the whole flywheel expands radially and the rim expands circumferentially. Thus, the diameter of the flywheel increases as the flywheel is rotated. Preferably the internal dimensions of the housing are from 1% to 3% larger than the dimensions of the flywheel when it is operating at its maximum operating speed.

Suitably, the housing comprises three parts viz a central portion and two end pieces; the central portion defines a volume which is substantially circular in cross-section along one axis but is not enclosed at either end of this axis and the end pieces are adapted to cover the open ends of the central portion. The volume of the central portion may be sufficiently large to accomodate the whole of the flywheel. Preferably, the tape envelopes and is in contact with at least 70% of the surface area of the housing. Certain areas which are unlikely to be subjected to impact by the flywheel or a part thereof in the event of failure may be left uncovered such as, for example, areas around apertures in the housing through which passes the rotatable shaft on which the flywheel or other rotatable body is mounted.

Generally, the flywheel will be cylindrical in which case the central portion is preferably an open ended cylinder and the end pieces are adapted to cover the ends of the cylinder.

The housing may be mounted within an outer casing which partially or completely encloses the housing according to the present invention. This outer casing may carry the bearings about which the flywheel rotates, may be designed to protect the housing from stones and road debris and may provide some protection against fire. The outer casing may, if it totally encloses the housing, also be sufficiently air-tight to enable a partial vacuum to be maintained within the casing.

A preferred embodiment of the present invention comprises a substantially rigid outer casing within which is mounted a housing, which housing comprises an open ended cylindrical section and two end pieces adapted to cover the ends of the cylindrical section, the end pieces and the cylindrical section are deformable under load and are held together by a length of a high tensile strength tape which is wrapped around the end pieces and cylindrical section.

The present invention includes a method of containing an energy storage flywheel which method comprises rotatably mounting the flywheel within a housing which comprises at least two seperable parts, wrapping a high tensile strength tape around the parts, under tension, with adjacent tape windings overlapping at their edges, to provide at least one layer of tape, which envelopes and is in contact with at least 50% of the surface area of the housing.

The invention will be described with reference to the accompanying drawings FIGS. 1 to 5 which illustrate the preferred embodiment of the invention.

Figure 1:
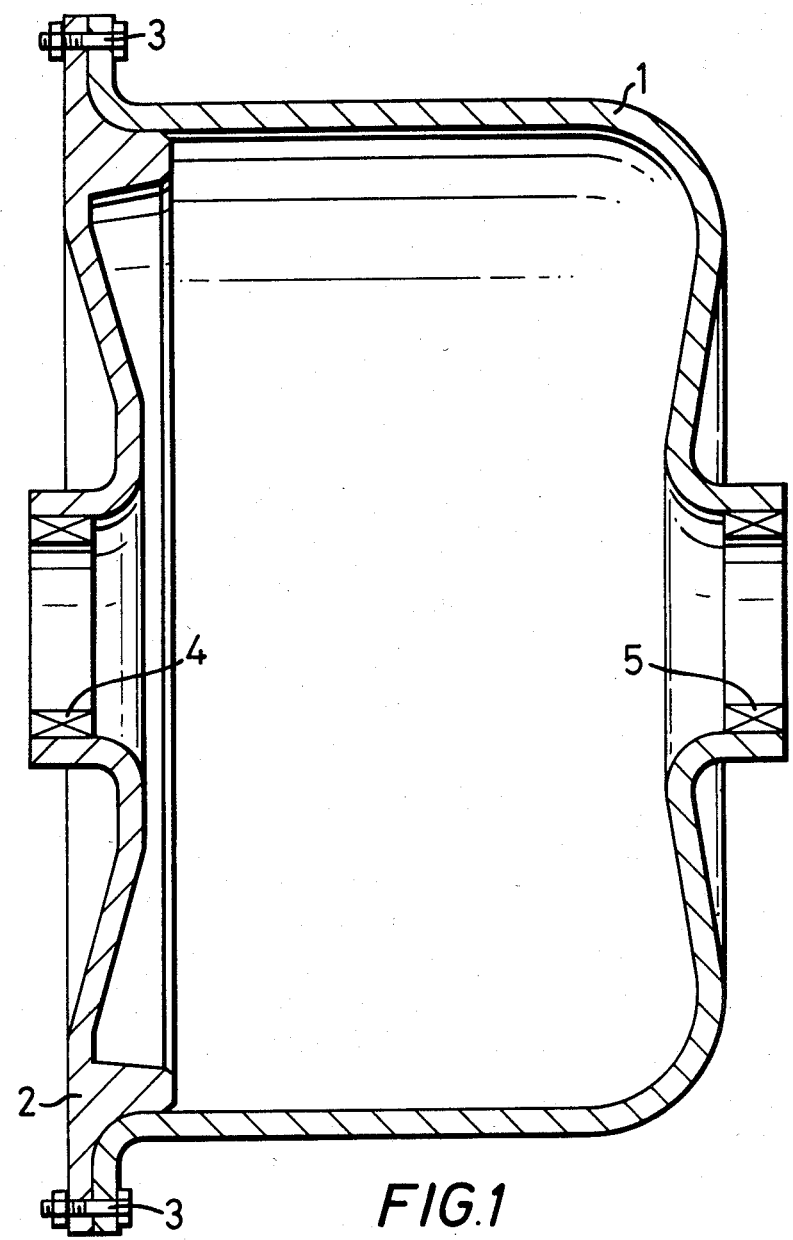
FIG. 1 is a cross-sectional view of the outer casing.
Figure 2:
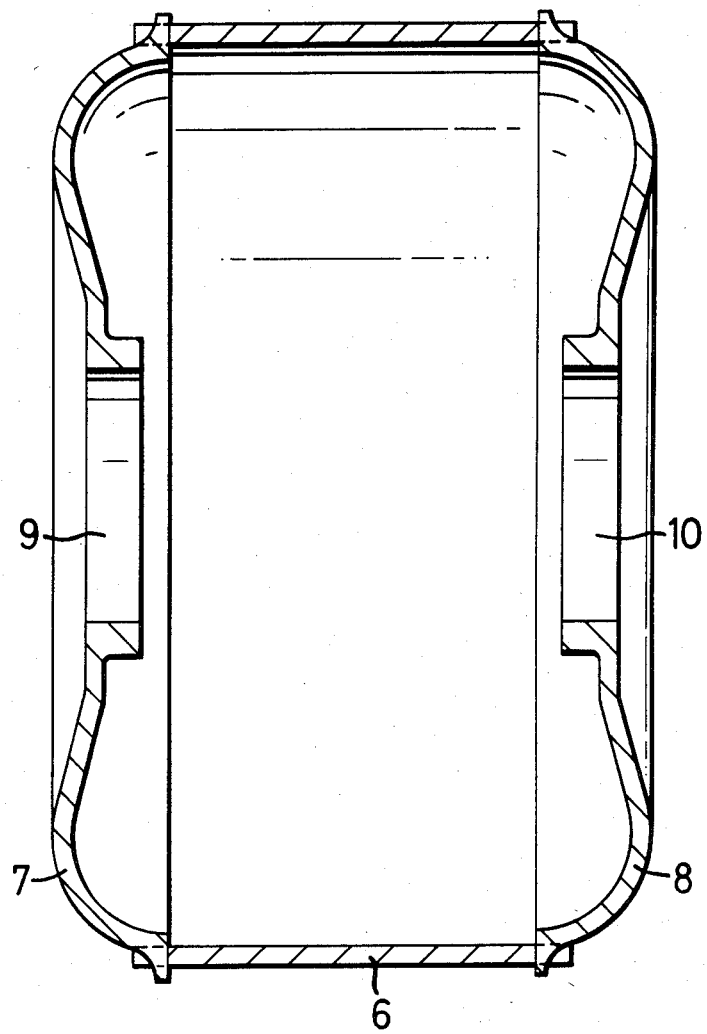
FIG. 2 is a cross-sectional view of the cylindrical section and end pieces of the housing.

The outer casing, shown in FIG. 1, is designed to totally enclose the housing and is substantially rigid. The outer casing may suitably be constructed of a fibre reinforced resin material such as glass fibres, aramid fibres or carbon fibres bonded in a matrix such as epoxy resin, polyester resin or phenolic resin. Since the housing shown in FIG. 2 is intended to contain a cylindrical flywheel, the housing is generally cylindrical and the outer casing as shown in FIG. 1 is also generally in the shape of a closed cylinder. The outer casing comprises at least two separable parts so that access may be gained for maintenance or inspection of the housing and flywheel. In FIG. 1 the outer casing comprises two parts 1 and 2. The two parts 1 and 2 may be attached together by any suitable means, e.g. bolts 3, to form the substantially cylindrical outer casing.

Bearings 4 and 5 for the flywheel shaft (not shown) are mounted in the parts 1 and 2. The bearings and flywheel shaft together with any seals used complete the enclosure of the housing.

When assembled, the outer casing is preferably sufficiently air tight to allow a partial vacuum to be maintained within the casing. If the material of construction of the outer casing is too permeable to air, the outer casing may be lined or coated with a less permeable material e.g. polyethylene. If the outer casing does not completely enclose the housing it may itself be enclosed or enveloped in a suitable cover such as for example a pressed or cast metal casing. if the outer casing is well sealed the partial vacuum may be maintained by using a pump at intervals. Alternatively, the partial vacuum may be maintained by a pump operating continuously or operating whenever the flywheel is rotating.

FIG. 2 illustrates the cylindrical section 6 and end pieces 7 and 8 of the housing.

The internal diameter of the cylindrical section 6 is only slightly larger than the expected maximum diameter of the flywheel.

Preferably the internal diameter of the cylindrical section is from 1% to 3% larger than the diameter which the flywheel is calculated to have when operating at its designed maximum operating speed. The axial length of the cylindrical section is preferably at least equal to the axial length of the flywheel to be contained but should be kept as short as possible.

The cylindrical section 6 may be made of metal but is preferably manufactured from high strength fibrous material bonded in a resin matrix. The fibres may be polyester, carbon, aramid or glass fibres and suitable resins include polyester, epoxy and phenolic resins. Phenolic resins are particularly suitable for use as the matrix material because of their ability to withstand high temperatures. Suitably, the parts of the housing are made of glass fibre reinforced phenolic resin. The cylindrical section 6 is preferably relatively thin so that the cylinder may deform if struck by the flywheel or a fragment thereof. The actual thickness will depend upon the dimensions of the cylinder and the strength of the material of construction. Preferably, the material of the cylindrical section 6 is harder than the material for the flywheel, so that in the event of failure the energy of the flywheel is dissipated by ablation of the flywheel rather than the cylindrical section as the flywheel or parts thereof run around the inside of the housing.

The end pieces 7 and 8 of the housing are preferably also made from composite materials and may be of the same materials as the cylindrical section. If the end pieces 7 and 8 are of a material which has a hardness less than that of the cylindrical section, wear plates of a harder material may be placed inside the end pieces. The end pieces 7 and 8 are preferably dished. The outer curved surface allows the overwrapped tape to follow more closely the shape of the housing. The curved surfaces of the end pieces preferably have radii of curvature which are at least equal to the width of the tape. For example, if the tape is 100 mm wide, the radii of curvature are preferably at least 100 mm. Each of the end pieces 7 and 8 has a central hole 9 and 10 through which the shaft of the flywheel (not shown) may pass.

The end pieces 7 and 8 are not rigidly connected to the cylindrical section 6 but rather they are held against the ends of the cylindrical section 6 by a length of a high tensile strength tape which is wrapped around the three components to form the housing. The tape may comprise polyester, glass or aramid fibres and is preferably a mixture of fibres. The fibres may be woven, but are preferably knitted to form tapes having the majority of the fibres, preferably more than 70%, arranged longitudinally. The tape therefore has a greater tensile strength in the longitudinal direction. However, the tape should also be sufficiently strong in the transverse direction to resist the tendency of the longitudinal fibres to separate when a load is applied across the width of the tape. The overwrapped tape should closely follow the shape of the assembled cylindrical portion 6 and end pieces 7 and 8 so that it is in contact with at least 50% of the surface area of the housing.

Figure 4:
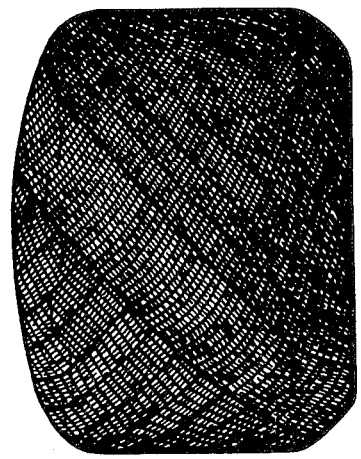
FIG. 4 is an illustration of the housing of FIG. 2 showing the overwrapped tape.
Figure 5:
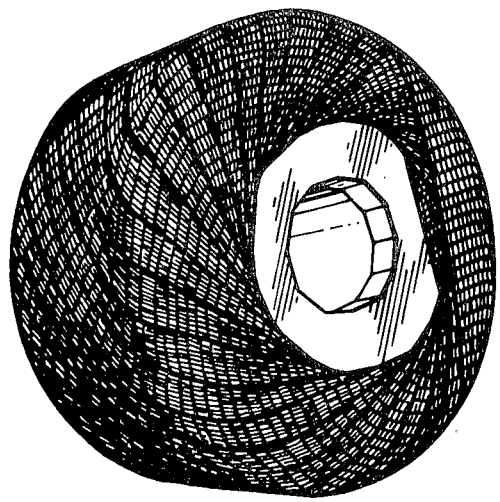
FIG. 5 is a further illustration of the housing of FIG. 2 showing the overwrapped tape and an uncovered area of the end piece.

As shown in FIGS. 4 and 5, the tape is wound from one end piece across the cylindrical section to the other end piece. Each winding overlays the previous winding preferably by at least 25% of the width of the tape. The tape is wound around the parts of the housing at an acute angle, e.g. of approximately 20° to 45°, to the longitudinal axis of the housing i.e. the axis of rotation of the flywheel. The tape may cover the housing (except the holes 9 and 10) in a plurality of layers. The winding angle of the tape in each layer is typically such that the windings overlay the windings of the previous layer at an angle of from 90° to 140°. The actual winding angles will depend on the geometry of the housing. The number of layers of the tape will be determined inter alia by the strength of the fibres, the expected maximum impact load and the geometry of the housing. The start of the tape may be fixed to a part of the casing or may be stitched to or spliced with adjacent windings. The end of the tape is preferably stitched or spliced to adjacent windings. The tape is not fixed to the cylindrical section, the end pieces or itself apart from at the start and finish of the winding. Preferably the tape is relatively smooth so that the tape layers can slide over one another when a part of the housing is deformed or moved.

As the tape is wound, it is preferably tensioned longitudinally to 0.5% to 2% of the breaking strength of the fibres. Projections are preferably provided on the surface of the housing. These projections are of assistance during the winding of the tape over the housing and resist movement of the fibres over the surface of the housing under normal operating conditions. The projections do not however prevent such movement when, in the event of failure of the flywheel, one or more parts of the housing is moved or deformed. These projections preferably form part of the cylindrical section 6 and/or the end pieces 7 and 8. As described below they are suitably arranged at the junctures of the cylindrical section 6 with the end pieces 7 and 8.

Preferably the housing is mounted in the outer casing so that the holes 9 and 10 in the end pieces 7 and 8 are coaxial with the bearings 4 and 5 carried by the parts 1 and 2 of the outer casing.

In the event of the flywheel failing and breaking up, fragments impacting the inner surface of the cylindrical section 6 of the housing would tend to deform the cylindrical section 6. A substantial proportion of the impact force would be transferred to the tape and thus as a result of the deformation of the housing the impact force is spread over a greater surface area of the housing. Any fragments impacting an end piece 7 or 8 would tend to force the end piece away from the cylindrical section 6. Such movement absorbs energy but is resisted by the tape which again transfers the force so that it is spread over a greater surface area.

As mentioned above, the cylindrical section 6 and end pieces 7 and 8 are not rigidly connected so that some relative movement is possible. However, it is preferable that there is some means for locating the end pieces 7 and 8 on the cylindrical section 6 so that the parts do not become seriously misaligned as the energy of the failed flywheel is being absorbed.

Figure 3:
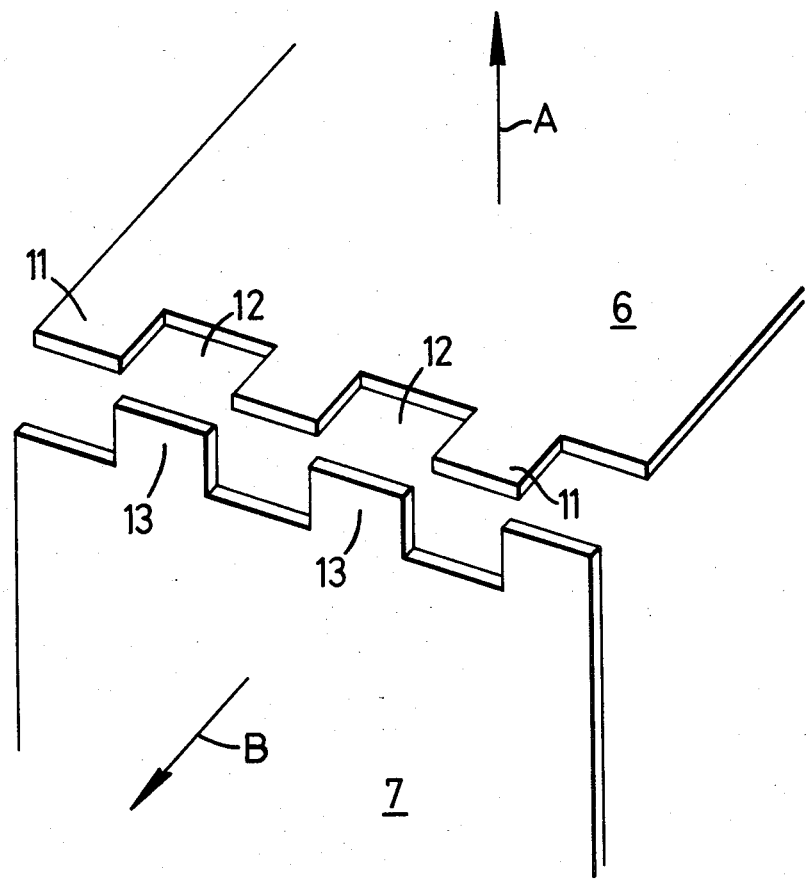
FIG. 3 is a schematic representation of parts of the housing showing means for locating the end pieces on the cylindrical section.

A suitable means for locating the parts of the housing is shown schematically in FIG. 3. A series of longitudinal projections 11 are formed around the circumference of the cylindrical section 6. The projections 11 are preferably of the same size and are evenly distributed about the circumference. The projections 11 as shown in the Figures may be formed by cutting out the sections 12 between the projections. The end pieces 7 and 8 have corresponding projections 13 which are substantially perpendicular to the projections 11 of the cylindrical section 6. These projections 13 are also preferably the same size and evenly distributed about the circumference.

The projections 11 and 13 are adapted to interleave. Thus when the components of the inner casing are assembled, the projections 13 of the end pieces 7 and 8 fit into the spaces 12 between the projections 11 of the cylindrical section 6.

If during the break-up of the flywheel the cylindrical section 6 is impacted by a fragment, the fragment would tend to deform the cylindrical section 6 in the general direction of arrow A in FIG. 3. However, the length of projection 13 should accomodate this deformation without the cylindrical section 6 and the end piece 7 becoming misaligned. Similarly, an impact on the end piece 7 would tend to move the end piece in the general direction of arrow B in FIG. 3 and this movement should be accomodated by the length of projection 11.

Other suitable means of maintaining the alignment of the end pieces 7 and 8 and the clyindrical section 6 may be used e.g. pins on the end pieces which project through corresponding slots in the clyindrical section 6 or vice versa.

The inner casing should be able to dissipate the energy released when a flywheel fails. However, if the inner casing is unable to contain all the fragments then the outer casing 1 would provide a further safety margin.

An experiment was carried out to assess the ability of apparatus, substantially as described with reference to the accompanying drawings, to contain an energy storage flywheel.

The flywheel comprised a glass fibre reinforced polyester resin hub on which was mounted a glass fibre reinforced epoxy resin rim. The rim had an internal diameter of 360 mm, an outside diameter of 460 mm and an axial length of 200 mm. The total mass of the flywheel and the shaft on which it was mounted was 29 kg.

The housing comprised a cylindrical section made of glass fibre reinforced phenolic resin and dished end pieces made of glass reinforced polyester resin. The cylindrical section and the dished end pieces all had a wall thickness of 5 mm.

The test was to be carried out with the flywheel rotating about a vertical axis. A phenolic resin wear plate was positioned in the end piece which was to form the bottom of the housing during the test.

The flywheel was positioned inside the housing which was then overwrapped with a high tensile strength tape as described above. The tape comprised a mixture of aramid and polyester fibres knitted together with the greater proportion of the fibres lying in the longitudinal direction. The tape was 100 mm wide and had a breaking strength in the longitudinal direction in excess of 2.5 tonnes. Two layers of tape were wrapped over the housing with a tape tension of 27 kg. Each winding overlaid the previous winding by approximately 50% over the cylindrical section and so the tape covering was effectively at least four times the thickness of the tape itself. The tape covering was greater than four times the thickness over parts of the end pieces where the overlap was greater than 50%, as shown in FIG. 5. The mass of the parts of the housing and the tape was just under one third of the mass of the flywheel and shaft. The radial clearance between the flywheel, at rest, and the cylindrical portion of the housing was 6 mm.

The shaft on which the flywheel was mounted was attached to a vertical wire to enable the flywheel to be rotated and an outer casing substantially as described above with reference to FIG. 1 was positioned around the housing. The clearance between the outer casing and the tape-wrapped housing was approximately 7 mm.

The flywheel was rotated up to a speed of 20,000 rpm at which speed the wire supporting the flywheel was sheared. The flywheel and shaft did not break up and came to rest inside the housing. 1.3 kg of material were lost from the flywheel and 0.3 kg were lost from the housing as the flywheel dissipated its kinetic energy but there was no penetration of the tape-wrapped housing.

I claim:

1. Apparatus suitable for containing a rotatable body which apparatus comprises at least two parts which together define a housing within which the rotatable body can be rotated chracterized in that the parts are secured together by a length of a high tensile strength tape which is wrapped around the parts to provide at least one layer of tape, overlapping at its edges, which envelops and is in contact with at least 50% of the surface area of the housing such that a point loading caused by the impact of the rotatable body, or a part thereof, with the inner surface of the housing is transformed into a loading over the surface of the parts wrapped with tape, said housing being mounted and enclosed within a casing which is able to maintain a partial vacuum within the housing and means for maintaining the partial vacuum.

2. Apparatus as claimed in claim 1 in which the parts of the apparatus which define the housing are relatively deformable under load.

3. Apparatus as claimed in claim 1 in which the parts of the housing comprise a cental portion which defines a volume which is substantially circular in cross-section along one axis but is not enclosed at either end of this axis and two end pieces which are adapted to cover the open ends of the central portion.

4. Apparatus as claimed in claim 3 in which the central portion is an open ended cylinder and the two end pieces are dished with outer curved surfaces.

5. Apparatus as claimed in claim 1 in which the parts of the housing are made from fibre reinforced resin material.

6. Apparatus as claimed in claim 5 in which the fibre reinforced resin material comprises a resin material selected from the group consisting of epoxy resin, polyester resin and phenolic resin reinforced with fibres selected from the group consisting of polyester fibres, glass fibres aramid fibres and carbon fibres.

7. Apparatus as claimed in claim 5 in which the parts of the housing are made from glass fibre reinforced phenolic resin.

8. Apparatus as claimed in claim 1 in which the high tensile strength tape comprises fibres selected from the group comprising polyester, glass and aramid fibres knitted into a tape with more than 70% of the fibres arranged longitudinally.

9. Apparatus as claimed in claim 1 in which the high tensile strength tape is wound around the parts of the housing at an acute angle to the longitudinal axis of the housing and with each tape winding overlaying the previous winding by at least 25% of the width of the tape.

10. Apparatus as claimed in claim 9 in which the parts of the housing are wrapped with a plurality of layers, the windings of each successive layer being at an angle of from 90° to 140° to the windings of the previous layer.

11. Apparatus as claimed in claim 1 in which the high tensile strength tape is tensioned, longitudinally, to 0.5% to 2% of the breaking strength of the fibres as it is wound around the parts which define the housing.

12. Apparatus as claimed in claim 1 in which means are provided for locating the parts of the housing relative to each other.

13. Apparatus as claimed in claim 12 in which the means for locating the parts of the housing comprises a series of projections on each part which are capable of interleaving with and are substantially perpendicular to the projections on an adjacent part.

14. Apparatus as claimed in claim 1 in which the housing is mounted within a casing which partially or completely encloses the housing.

15. Apparatus as claimed in claim 14 in which the casing comprises at least two separable parts which enclose the housing.

16. Apparatus as claimed in claim 14 in which the parts of the casing are made of fibre reinforced resin material.

17. Apparatus as claimed in claim 16 in which the fibre reinforced resin material comprises a resin material selected from the group consisting of epoxy resin, polyester resin and phenolic resin reinforced with fibres selected from the group consisting of polyester fibres, glass fibres aramid fibres and carbon fibres.

18. Apparatus for containing an energy storage flywheel as claimed in claim 1 in which the internal diameter of the housing is from 1% to 3% larger than the diameter which the flywheel is calculated to have when operating at its designed maximum operating speed.

19. A method of containing an energy storage flywheel which method comprises rotatably mounting the flywheel within a housing which comprises at least two seperable parts, wrapping a high tensile strength tape around the parts, under tension, with adjacent tape windings overlapping at their edges, to provide at least one layer of tape, which envelopes and is in contact with at least 50% of the surface area of housing.

* * * * *